(12) United States Patent
Goldbaum

(10) Patent No.: US 7,517,001 B1
(45) Date of Patent: Apr. 14, 2009

(54) TRIM SYSTEM FOR VEHICLE BUMPERS, DOORS AND PANELS

(76) Inventor: Harold Goldbaum, 22 Pine Arbor La., Apt. 202, Vero Beach, FL (US) 32962

(*) Notice: Subject to any disclaimer, the term of this patent is extended or adjusted under 35 U.S.C. 154(b) by 41 days.

(21) Appl. No.: 11/708,383

(22) Filed: Feb. 20, 2007

(51) Int. Cl.
*B60R 19/42* (2006.01)

(52) U.S. Cl. ..................... 296/128; 296/126

(58) Field of Classification Search ............... 296/1.08, 296/39.1; 293/128, 126; 52/716.5, 716.8
See application file for complete search history.

(56) References Cited

U.S. PATENT DOCUMENTS

| | | | |
|---|---|---|---|
| 3,359,030 A * | 12/1967 | Newman | 293/128 |
| 3,782,768 A | 1/1974 | Moore | |
| 3,843,475 A | 10/1974 | Kent | |
| 3,982,780 A | 9/1976 | Seith | |
| 4,002,362 A | 1/1977 | Sears | |
| 4,277,526 A | 7/1981 | Jackson | |
| 4,422,680 A * | 12/1983 | Goupy | 293/122 |
| 4,617,209 A * | 10/1986 | Ives | 428/31 |
| 4,712,826 A * | 12/1987 | Omori | 296/93 |
| 4,723,388 A * | 2/1988 | Zieg | 52/665 |
| 4,808,450 A | 2/1989 | Guy | |
| 5,219,626 A | 6/1993 | Irrgang | |
| 5,456,957 A | 10/1995 | Jackson et al. | |
| 5,520,765 A * | 5/1996 | Zoller | 156/245 |
| 6,145,908 A * | 11/2000 | Deb et al. | 296/39.1 |
| 6,179,354 B1 | 1/2001 | Bennett | |
| 6,527,319 B1 | 3/2003 | Martel | |
| 6,692,047 B1 | 2/2004 | Solon | |
| 7,073,831 B2 | 6/2006 | Evans | |

FOREIGN PATENT DOCUMENTS

| | | |
|---|---|---|
| DE | 19938474 | 3/2001 |
| DE | 20112155 | 11/2001 |
| DE | 10041970 | 3/2002 |

\* cited by examiner

*Primary Examiner*—Hilary Gutman
*Assistant Examiner*—Melissa A Black
(74) *Attorney, Agent, or Firm*—Allen D. Hertz

(57) ABSTRACT

Trim elements affixable to a vehicle body provide protection to the vehicle body from dents. Each of the trim elements comprises an outer shell of determinate length wherein the outer shell has a conformable wall for interfacing with a vehicle body and a convex wall affixed to outer edges of the conformable wall. This outer shell defines an interior void that is filled with energy absorbing foam.

22 Claims, 3 Drawing Sheets

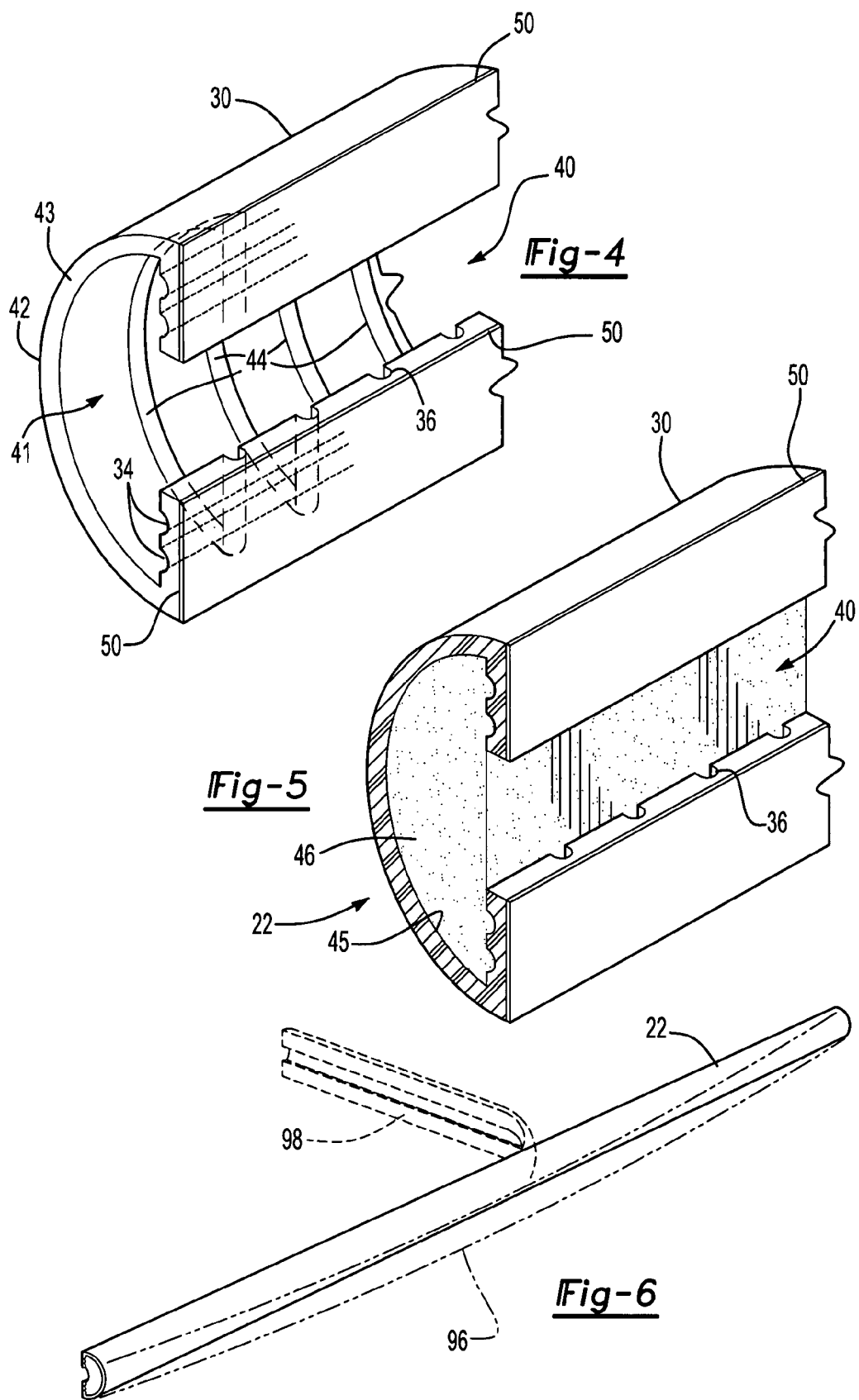

TRIM SYSTEM FOR VEHICLE BUMPERS, DOORS AND PANELS

BACKGROUND OF THE INVENTION

1. Field of the Invention

The present invention relates to protective strips for vehicles and more particularly to a system of protective, resilient thermoplastic strips for the protection of painted surfaces of vehicles such as doors, bumpers, and quarter panels.

2. Discussion of the Related Art

Over the past century, the automobile has become a central part of our society both in terms of its use and as a major industry in the production thereof. Aside from the utilitarian aspect of the automobile, many automobile owners have taken great pride in their vehicle as a personal statement. Thus, many individuals take great care to maintain the appearance their vehicle keeping the body free of dents and the surface free of scratches. Unfortunately, automobiles are subjected to daily use in traffic and parking lots that are often more conducive to dings, dents, and scratches than to the preservation of the vehicle's appearance. One of the initial attempts to protect a vehicle's body was to install front and rear chrome plated metal bumpers.

Current automobile bumpers no longer resemble the original metal bumpers introduced on early automobiles. New bumpers are now mechanical devices incorporating shock-absorbing mechanisms that are covered with a flexible, resilient material. The resilient material, such as a moldable resin, is painted to match the vehicle paint scheme on which it is installed. While these advancements have in many respects increased the safety of an automobile during low speed impacts, in other respects they are now more prone to damage from minor dents and scratches.

During the transition from chrome plated metal bumpers to today's mechanisms various solutions were proposed to protect the bumper surface. One attempt was the addition of black rubber inserts embedded in the bumper that also wrapped around the corners of the vehicle. Other attempts also included bumper covers and rub strips that clipped onto the front and rear bumpers. However, after the development of today's covered bumper mechanisms, these devices have fallen from favor and are no longer used.

One area of the automobile on which scratch and dent protection is still focused is the quarter panel and door area. Over the years various solutions to this problem have been proposed, such as movable cushions that are attached to the vehicle's sides, magnetic cushions, or other removable protective coverings. During one period, protective molding strips were added to the vehicle's door and quarter panels that had limited success in protecting from minor glancing scratches. However, they were not shock absorbent and were thus subject to damage and destruction by even minor shocks. Therefore, even these strips have been disfavored for use on today's vehicles. Today, the door and quarter panels of a vehicle typically have no exterior protective feature from minor shocks and glancing impacts that can cause scratches and dents.

Minor scratches and dents, either to vehicle bumpers, doors, or quarter panels, be they minor or moderate, are now quite expensive to repair and a majority of these could be avoided with an adequate protection system. Thus, what is desired is an inexpensive, easy to install protective system for vehicle bumpers, doors and quarter panels that does not detract from the vehicle's aesthetics.

SUMMARY OF THE INVENTION

The present invention is directed to trim elements affixable to a vehicle body that satisfies the need to provide protection to the vehicle body from dents. Each of the trim elements comprises an outer shell of determinate length wherein the outer shell has a conformable wall for interfacing with a vehicle body and a convex wall affixed to outer edges of the conformable wall. The outer shell defines an interior void filled with energy absorbing foam.

Another aspect of the present invention is a kit of protective trim elements for applying to a vehicle body. The kit includes straight element having female configured end portions for connecting with other kit elements. Corner elements have a preformed bend to apply to portions of the vehicle body at the corners of the vehicle. Each of the corner elements has male configured end portions. End elements also have a male configured end portion at one end and a closed tapered at an opposite end. Each of the elements has an outer shell filled with energy absorbing foam wherein one wall of the shell is conformable with the vehicle body and a convex wall affixed to the edges of the conformable wall. A connector element having male end portions can be included for interconnecting two straight elements.

These and other features, aspects, and advantages of the invention will be further understood and appreciated by those skilled in the art by reference to the following written specification, claims and appended drawings.

BRIEF DESCRIPTION OF THE DRAWINGS

For a fuller understanding of the nature of the present invention, reference should be made to the following detailed description taken in conjunction with the accompanying drawings in which:

FIG. 4 is a reverse perspective view of the shell covering of FIG. 3;

FIG. 5 is a rear perspective view of a segment of a trim element;

FIG. 6 is a perspective view of a straight trim element illustrating its conformability to vehicle curves;

Like reference numerals refer to like parts throughout the several views of the drawings.

DETAILED DESCRIPTION OF THE PREFERRED EMBODIMENT

Figure 1:
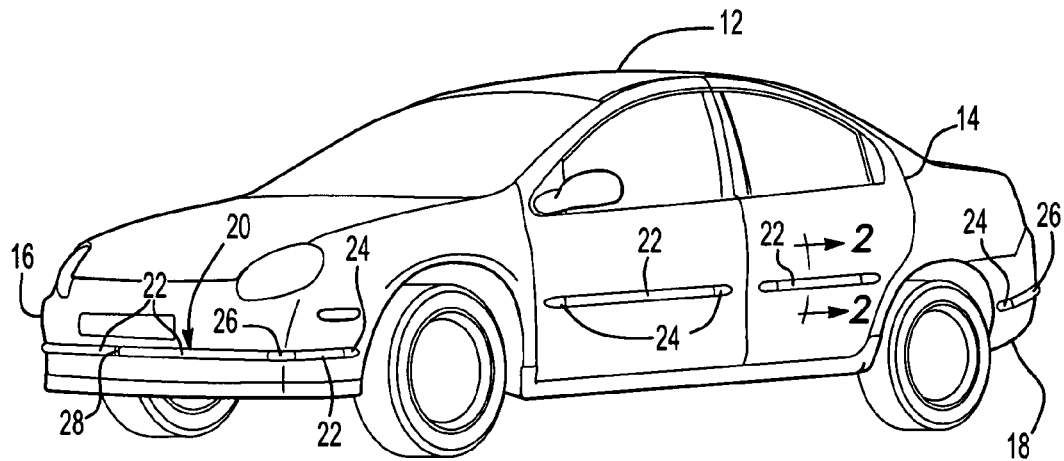
FIG. 1 is a perspective view of an automobile having a trim system embodying the present invention, wherein the trim elements are installed on automobile doors, body panels, and bumpers.
Figure 3:
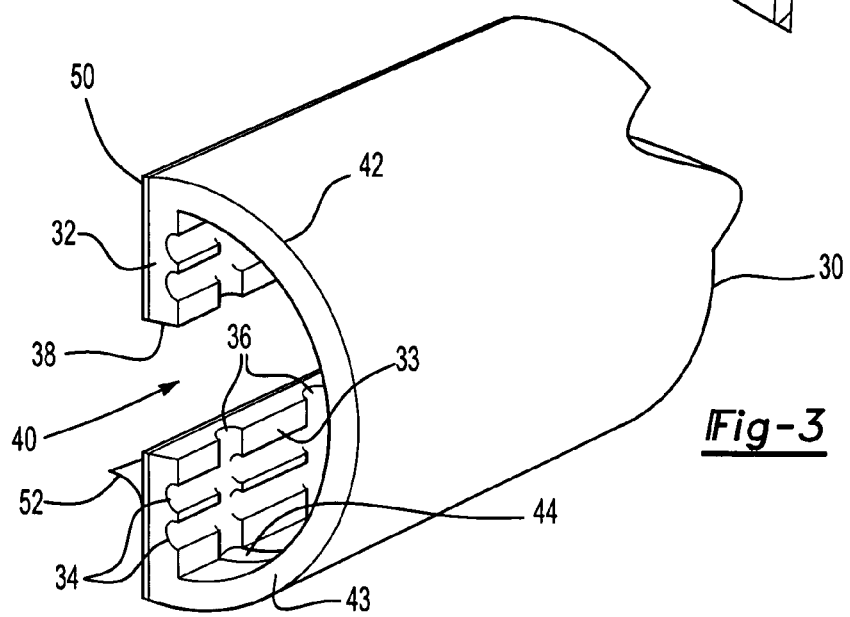
FIG. 3 is a perspective view of the shell covering of the trim element in FIG. 2 illustrating its interior configuration.

For purposes of description herein, the terms "upper", "lower", "left", "rear", "right", "front", "vertical", "horizontal", and derivatives thereof shall relate to the invention as oriented in FIGS. 1 and 3. However, one will understand that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a kit 20 of protective trim elements applied to a vehicle 12 for protecting the vehicle body that is one of the preferred embodiments of the present invention and illustrates its various components.

Referring to FIGS. 3-5, each element of kit 20 has an outer shell 30 formed from a non-flammable, pliable, resilient moldable resin such as a thermoplastic resin. The material is also preferably resistant to ultraviolet radiation (so that it will not discolor), temperature variations, moisture, staining, soap and the like, and to most solvents. Outer shell 30 of each element may be coated with a low-friction polymer, such as PTFE (Polytetrafluoroethylene), which would act to deflect minor impacts. Geometrically, outer shell 30 has a "D" shaped cross-section formed by a convex wall 42 and a substantially planar conformable wall 32 extending between the edges of convex wall 42. The "D" shaped cross-section formed by walls 32, 42 further defines an inner void 41 (FIG. 4). Void 41 is filled with thermoplastic energy absorbing foam 46 that is preferably a urethane composition and having characteristics including those of high resilience and not prone to discoloration, cracking, or hardening, variations of which are well known within the industry.

The inner surface 45 of convex wall 42 includes a plurality of longitudinally spaced vertical ribs 44 (FIGS. 3-4) formed thereon. Vertical ribs 44 provide supplemental strength to convex wall 42 for impact resistance. Conformable wall 32 is substantially planar in form and has an inner face 33 that defines a plurality of horizontal grooves 34 and vertical grooves 36 to improve the conformability of wall 32 to the surface curvature of vehicle 12 on which it is affixed. The conformability of wall 32 can also be enhanced by forming outer shell 30 such that conformable wall 32 has a thickness 38 that is less than a thickness 43 of convex wall 42. The formability of a trim element so configured is illustrated in FIG. 6 wherein a straight element 22 can be slightly flexed as illustrated by phantom form 96 or sharply bent as illustrated by phantom form 98 to wrap around a vehicle feature such as a bumper.

An adhesive layer 50 is affixed to the outer surface of conformable wall 32 to provide the bonding force for attaching the various elements 22, 24, 26, 28 of kit 20 to vehicle 12. In the most preferred embodiment, adhesive layer 50 is a double faced pressure sensitive tape that is suitable for high-energy surfaces, slow setting with a strong bond and being temperature, moisture and resistant to most solvents. The pressure sensitive tape has one surface applied to the conformable wall 32 of each of elements 22, 24, 26, 28 and another surface covered with a removable backing 52 that can be easily peeled away to expose the adhesive surface to bond to vehicle 12. The adhesive utilized is preferably sensitive to a solvent that permits easy removal of an element 22, 24, 26, 28 in the event a peeled away to expose the adhesive surface to bond to vehicle 12.

Figure 2:
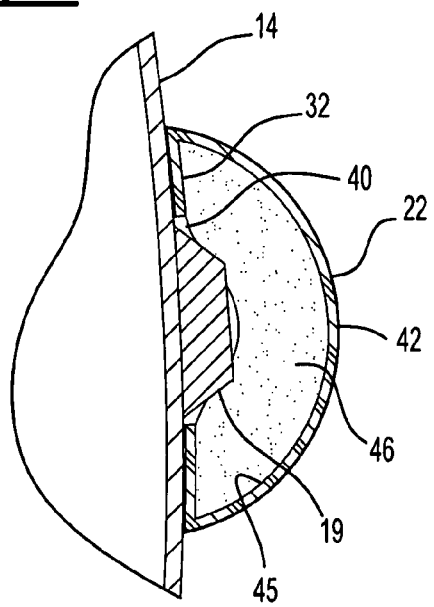
FIG. 2 is a cross-sectional view of a trim element shown in FIG. 1 and taken along the line 2-2, FIG. 1.

Referring to FIGS. 2 and 5, each of the elements of kit 20 can also define a longitudinally extending channel 40 formed through conformable wall 32. Channel 40 is sized such that it can be affixed to a portion of vehicle 12, such as door 14, that has a pre-existing protective strip 19 affixed thereto without requiring the removal of pre-existing strip 19. The width of channel 40 is such to permit the remaining portion of conformable wall 32 to contact the surface of vehicle door 14. The resilience of foam 46 is such to permit foam 46 to form around any portion of pre-existing strip 19 that may interfere with foam 46.

Figure 7:
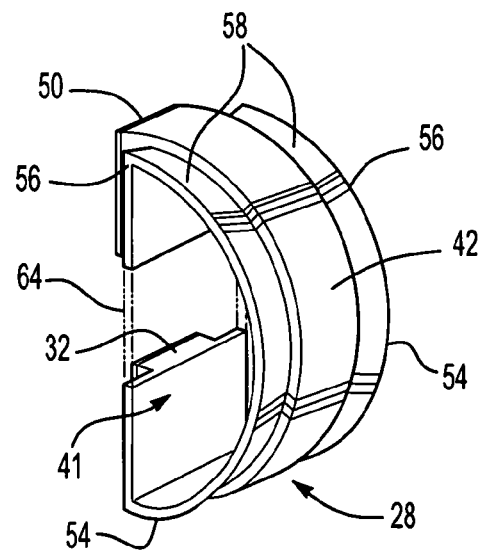
FIG. 7 is a perspective view of a connector element for connecting adjacent trim elements.

FIG. 7 illustrates a connector element 28 for use when it is desired to connect two straight elements 22 adjacent to one another. Connector element 28 has a minimal length and thus does not have its interior void 41 filled with foam. However, each end of connector element 28 has a male configuration 54. Male configuration 54 is the same as other male configurations 54 of other elements of kit 20. Male configuration 54 includes a recessed lip 56 that has an outer surface 58. Outer surface 58 generally conforms to the inner surface form of the "D" shaped cross-section defined by walls 32 and 42 and is slightly outwardly flared in the direction of the outer surface of shell 30 for positive retention of lip 56 in adjacent elements of kit 20. An end edge of surface 58 can be radiused to facilitate the insertion of recessed lip 56 into the female recess 53 of a female configured end 54 (FIG. 8) of an adjacent member. Phantom continuous wall 64 illustrates a configuration of conformable wall 32 wherein groove 40 (FIG. 5) has been eliminated.

Referring again to FIG. 8, which illustrates individual elements, 22, 24, 26, 28 of kit 20, all having similar "D" shaped cross-sections and construction as described above. Straight elements 22 have a determinate length with female configured ends 55 having a female recess 53. Female recesses 53 positively receive and retain recessed lips 56 of adjacent elements of kit 20. Straight elements 22 can also be trimmed to a custom length for retrofitting existing vehicles. In cases where a straight element 22 is trimmed to a custom length, the trimmed end can readily be formed into a female end 55 by trimming a small portion of resilient foam 46 from inner periphery 45 of straight element 22. Element 22 is then able to receive recessed lip 56 of a male configured end 54 of an adjacent member such as corner element 26.

Corner element 26 has male configured ends 54 at each end thereof and includes a central preformed bend 60. While straight element 22 possesses the capability of wrapping around the corners of a vehicle surface, kit 20 includes corner elements 26 for use in retrofitting vehicles already in service. Such preformed corner elements 26 provide an ease of installation geared to the individual user who does not typically have the labor skills or the more specialized tools that a vehicle manufacturer possesses for installing trim as original equipment.

Figure 8:
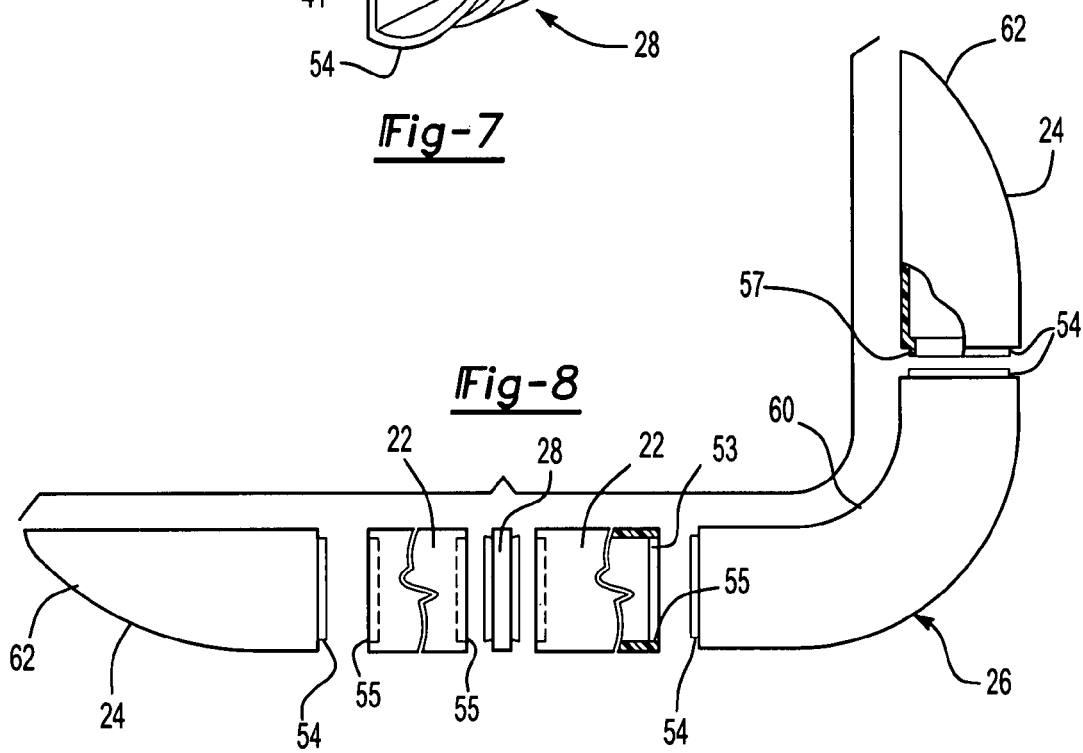
FIG. 8 is an exploded view of kit of protective trim elements.

End element 24 includes a tapered closed end 62 wherein the size of conformable wall 32 and convex wall 42 are gradually reduced dimensionally leading to a double-tapered terminus at the closed end where no other element of kit 20 is attached. The terminus can either be truncated with a substantially flat end or can end wherein one or both dimensions approach zero (as shown in FIG. 8). Such smaller size at the terminus facilitates the opening of vehicle doors so that the end of end element 23 does not interfere with nearby surfaces of the vehicle. The opposite end of end element 24 has a male configuration 54 wherein recessed lip 56 has been replaced by a removable lip 57. In applications where an end element 24 is desired to be interconnected to a corner element 26, each having a male end 54, removable lip 57 can be removed from end element 24 thus transforming male end 54 into a female end 55 for mating with male end 54 of corner element 26. Additionally, two end elements 24 can be mated by removing removable lip 57 from one of the end elements 24 and then joining the elements 24 in an end-to-end fashion to create a short protective trim section (not shown) for use on quarter panels or other areas on which the use of longer sections are not feasible.

Referring again to FIG. 1, the various elements 22, 24, 26, 28 of a kit 20 are illustrated as being applied to vehicle 12. Vehicle 12 has a front bumper 16 wherein two straight elements 22 are affixed to a front portion thereof wherein the elements 22 are interconnected with a connector element 28. A corner element 26 is shown affixed to a left front corner of bumper 16 with a straight element 22 trimmed to a custom length and mated with corner element 26. An end element 24 is affixed to an opposite end of trimmed straight element 22 to aesthetically terminate the continuously interconnected trim elements 22, 24, 26, 28 around front bumper 16. Similarly, rear bumper 18 has a corner element 26 affixed to a rear left corner and an end element 24 mated to an end of corner element 26. The interconnection is facilitated by removing removable lip 57 from end element 24 (FIG. 8), thus permitting end element 24 to mate with the male end of corner element 26. Doors 14 of vehicle 12 also have trim elements of kit 20 affixed thereto wherein a straight element 22 is trimmed to a custom length and has end elements 24 connected at each end thereof and affixed to door 14.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

What is claimed is:

1. A protective trim element for applying to a vehicle body, said protective trim element comprising:
   an outer shell of a predetermined length, the outer shell defined by a laterally extending generally uniformly thick arcuate wall, the wall having a continuous vertical curvature terminating at upper and lower conformable walls, the conformable walls extending inwardly toward one another and each terminating at a lip edge, the lip edges extending laterally generally parallel to each other, separated by a gap having a generally uniform gap distance, and unrestrained, the gap defining a continuous opening laterally along the outer shell lengths the arcuate wall and the wall lips defining an outer shell interior void, the gap providing a clearance enabling the outer shell to be disposed over an existing protrusion on a surface of the vehicle; and
   an energy absorbing foam substantially filling the outer shell interior void.

2. The protective trim element according to claim 1 further including an adhesive layer on an outer surface of said conformable wall for bonding to the vehicle body and bumpers.

3. The protective trim element according to claim 2 wherein said adhesive layer comprises a double sided pressure sensitive adhesive tape.

4. The protective trim element according to claim 1 wherein said conformable wall defines a longitudinal groove therealong, said longitudinal groove sized to receive a smaller pre-existing trim element therein.

5. The protective trim element according to claim 1 wherein said convex wall includes a plurality of longitudinally spaced vertical ribs formed on an inner surface thereof.

6. The protective trim element according to claim 1 wherein a thickness of said conformable wall is less than a thickness of said convex wall.

7. The protective trim element according to claim 1 wherein said conformable wall defines a plurality of grooves on an inner surface to improve the conformability of said conformable wall.

8. The protective trim element according to claim 7 wherein said plurality of grooves comprises a plurality of intersecting horizontal and vertical grooves.

9. The protective trim element according to claim 1 wherein said outer shell is formed from a thermoplastic.

10. The protective trim element according to claim 1 wherein said energy absorbing foam is an elastomer.

11. A kit of protective trim elements for applying to a vehicle body said kit comprising:
    at least one straight element having female configured end portions;
    at least one corner element having a preformed bend and male configured end portions; and
    at least one end element having a male configured portion at one end thereof and a tapered closed end portion at an opposite end thereof; wherein each said element further comprises:
    an outer shell of a predetermined length, the outer shell defined by a laterally extending generally uniformly thick arcuate wall, the wall having a continuous vertical curvature terminating at upper and lower conformable walls, the conformable walls extending inwardly toward one another and each terminating at a lip edge, the lip edges extending laterally generally parallel to each other, separated by a gap having a generally uniform gap distance, and unrestrained, generally uniform gap distance, the gap defining a continuous opening laterally along the outer shell length, the arcuate wall and the wall lips defining an outer shell interior void, the gap providing a clearance enabling the outer shell to be disposed over an existing protrusion on a surface of the vehicle; and
    an energy absorbing foam substantially filling said interior void.

12. The kit of protective trim elements according to claim 11 and further including a connector element of a length and having male configured ends.

13. The kit of protective trim elements according to claim 12 wherein said male configured ends comprise a recessed lip extending from said convex wall at an end of said element.

14. The kit of protective trim elements according to claim 13 wherein said recessed lip is flared outwardly toward an outer surface of said shell.

15. The kit of protective trim elements according to claim 13 wherein said recessed lip is removable to transform said male configured end to a female configured end for engagement with a male configured end of another trim element of said kit.

16. The kit of protective trim elements according to claim 11 wherein said conformable wall defines a longitudinal groove therealong, said longitudinal groove sized to receive a small preexisting trim element therein.

17. The kit of protective trim elements according to claim 11 wherein said convex wall includes a plurality of longitudinally spaced vertical ribs formed on an inner surface thereof.

18. The kit of protective trim elements according to claim 11 wherein said conformable wall defines a plurality of grooves on an inner surface to improve the conformability of said conformable wall.

19. The kit of protective trim elements according to claim 18 wherein said plurality of grooves comprises a plurality of intersecting horizontal and vertical grooves.

20. The kit of protective trim elements according to claim 11 further including an adhesive layer on an outer surface of said conformable wall for bonding to the vehicle body.

21. The kit of protective trim elements according to claim 20 wherein said adhesive layer comprises a double sided pressure sensitive adhesive tape.

22. The kit of protective trim elements according to claim 11 wherein a thickness of said conformable wall is less than a thickness of said convex wall.

* * * * *